(12) United States Patent
Bi

(10) Patent No.: US 10,171,418 B2
(45) Date of Patent: Jan. 1, 2019

(54) METHOD AND APPARATUS FOR ACCESSING DEMILITARIZED ZONE HOST ON LOCAL AREA NETWORK

(71) Applicant: ZTE CORPORATION, Shenzhen, Guangdong Province (CN)

(72) Inventor: Mingda Bi, Shenzhen (CN)

(73) Assignee: XI'AN ZHONGXING NEW SOFTWARE CO., LTD (CN)

( * ) Notice: Subject to any disclaimer, the term of this patent is extended or adjusted under 35 U.S.C. 154(b) by 566 days.

(21) Appl. No.: 14/651,845

(22) PCT Filed: Sep. 17, 2013

(86) PCT No.: PCT/CN2013/083642
§ 371 (c)(1),
(2) Date: Jun. 12, 2015

(87) PCT Pub. No.: WO2014/110912
PCT Pub. Date: Jul. 24, 2014

(65) Prior Publication Data
US 2015/0319134 A1 Nov. 5, 2015

(30) Foreign Application Priority Data
Jan. 16, 2013 (CN) .......................... 2013 1 0016322

(51) Int. Cl.
*G06F 15/16* (2006.01)
*H04L 29/12* (2006.01)
(Continued)

(52) U.S. Cl.
CPC ...... *H04L 61/2514* (2013.01); *H04L 12/2856* (2013.01); *H04L 12/2869* (2013.01); *H04L 61/6068* (2013.01); *H04L 63/0209* (2013.01)

(58) Field of Classification Search
CPC ............. H04L 61/2514; H04L 61/6068; H04L 12/2869; H04L 12/2856; H04L 63/0209
See application file for complete search history.

(56) References Cited

U.S. PATENT DOCUMENTS

2003/0033418 A1   2/2003 Young et al.
2003/0093563 A1 * 5/2003 Young ................ H04L 12/4633
                                                        709/245
(Continued)

FOREIGN PATENT DOCUMENTS

CN     102143233 A    8/2011
CN     102149024 A    8/2011
CN     103095705 A    5/2013

OTHER PUBLICATIONS

Hubbard S D et al: "Firewalling the Net", BT Technology Journal, vol. 15 No. 2, Apr. 1, 1997, pp. 94-106, XP000703560.
(Continued)

*Primary Examiner* — Michael A Keller
*Assistant Examiner* — Austin J Moreau
(74) *Attorney, Agent, or Firm* — Plumsea Law Group, LLC

(57) ABSTRACT

A method for accessing a demilitarized zone (DMZ) host in a local access network (LAN) includes: configuring a mapping relationship between public IP addresses obtained from a wide area network (WAN) side and private IP addresses of demilitarized zone hosts at a LAN side; after receiving an access request sent by a client at the WAN side, modifying a destination IP address in the access request to the private IP address of a corresponding demilitarized zone host at the LAN side according to the configured mapping relationship, and sending the modified access request to the demilitarized zone host; receiving a reply message returned by the demilitarized zone host, modifying a source IP address contained in the reply message to a public IP address of a client at the
(Continued)

WAN side, and sending the modified reply message to the WAN side. The present document also discloses a corresponding apparatus.

8 Claims, 6 Drawing Sheets

(51) Int. Cl.
    *H04L 12/28*     (2006.01)
    *H04L 29/06*     (2006.01)

(56) References Cited

U.S. PATENT DOCUMENTS

2006/0126613 A1*   6/2006   Zweig ................. H04L 12/5692
                                                          370/389
2012/0214492 A1*   8/2012   Mihaly ............... H04W 76/041
                                                          455/437

OTHER PUBLICATIONS

European Search Report dated Jun. 1, 2016 in European Patent Application No. 13871858.0.

* cited by examiner

METHOD AND APPARATUS FOR ACCESSING DEMILITARIZED ZONE HOST ON LOCAL AREA NETWORK

CROSS-REFERENCE TO RELATED APPLICATION(S)

This application is the U.S. National Phase application of PCT application number PCT/CN2013/083642 having a PCT filing date of Sep. 17, 2013, which claims priority of Chinese patent application 201310016322.0 filed on Jan. 16, 2013, the disclosures of which are hereby incorporated by reference.

TECHNICAL FIELD

The present document relates to the field of broadband network technology, and more particularly, to a method and system for accessing a demilitarized zone host in the LAN.

BACKGROUND OF THE RELATED ART

Currently in some broadband access scenarios at SOHO office, besides the basic Internet services, it also needs to put multiple devices in the SOHO office area for the access of the WAN (wide area network) side, and now for the case of IPv4 protocol stack, when dialing through the WAN side, a CPE (Customer Premise Equipment) usually obtains only one IP address at the WAN side, and when the WAN side accesses a DMZ (demilitarized zone) host at the LAN (Local Area Network) side through the CPE, the IP address obtained by the CPE is only mapped to one DMZ host; and, since the CPE WAN side itself will provide some external services, some ports at the CPE WAN side need to be reserved, therefore not all the ports at the CPE WAN side can be mapped to the DMZ host, thus the utilization efficiency of IP addresses at the WAN side cannot be improved, which brings inconvenience for the WAN side to access a DMZ host at the LAN side.

SUMMARY OF THE INVENTION

The main objective of the present document is to provide a method and system for accessing a demilitarized zone host in the local access network (LAN), which aims to improve the utilization efficiency of IP addresses at the WAN side, and is able to provide relatively great convenience for the access of the WAN side.

The present document provides a method for accessing a demilitarized zone host in a local area network (LAN), comprising:

configuring a mapping relationship between public internet protocol (IP) addresses obtained from a wide area network (WAN) side and private IP addresses of demilitarized zone hosts at the LAN side;

after receiving an access request sent by a client at the WAN side, modifying a destination IP address in the access request to a private IP address of a corresponding demilitarized zone host at the LAN side according to the configured mapping relationship, and sending the modified access request to the demilitarized zone host;

receiving a reply message returned by the demilitarized zone host, modifying a source IP address contained in the reply message to a public IP address of a client at the WAN side, and sending the modified reply message to the WAN side.

Preferably, before performing said configuring a mapping relationship between public IP addresses obtained from the WAN side and private IP addresses of demilitarized zone hosts at the LAN side, further comprising:

configuring slot information used for storing the public IP addresses obtained from the WAN side, wherein the slot information corresponds to the public IP addresses one-to-one.

Preferably, said configuring a mapping relationship between public IP addresses obtained from the WAN side and private IP addresses of demilitarized zone hosts at the LAN side comprises:

configuring a one-to-one mapping relationship between the public IP addresses and the private IP addresses, or configuring a mapping relationship between the public IP addresses as well as their ports and the private IP addresses as well as their ports.

Preferably, after performing said configuring the mapping relationship between the public IP addresses obtained from the WAN side and the private IP addresses of the demilitarized zone hosts at the LAN side, further comprising:

when dialing through the WAN side, sending an extension tag used to indicate an identity to a server at the WAN side;

receiving a plurality of IP addresses sent by the server at the WAN side through the extension tag, and filling public IP addresses therein into the corresponding slot information.

Preferably, said receiving a reply message returned by a demilitarized zone host and modifying the source IP address contained therein to the public IP address comprises:

receiving a reply message returned by the demilitarized zone host according to the access request, wherein the reply message comprises a destination IP address and a source IP address, wherein the destination IP address is the IP address of a client at the WAN side, and the source IP address is the private IP address of the demilitarized zone host;

modifying the source IP address to the public IP address of the client at the WAN side according to the configured mapping relationship.

The present document further provides an apparatus for accessing a demilitarized zone host in the LAN, comprising:

a first configuring module, configured to: configure a mapping relationship between public IP addresses obtained from a WAN side and private IP addresses of demilitarized zone hosts at a LAN side;

a first modifying module, configured to: after receiving an access request sent by a client at the WAN side, modify a destination IP address in the access request to the private IP address of a corresponding demilitarized zone host at the LAN side according to the configured mapping relationship, and send the modified access request to the demilitarized zone host;

a second modifying module configured to: receive a reply message returned by the demilitarized zone host, modify a source IP address contained in the reply message to the public IP address of a client at the WAN side, and send the modified reply message to the WAN side.

Preferably, the apparatus for accessing a demilitarized zone host in the LAN further comprises:

a second configuring module, configured to: configure slot information used for storing public IP addresses obtained from the WAN side, wherein the slot information corresponds to the public IP addresses one-to-one.

Preferably, the first configuring module is configured to:

configure a one-to-one mapping relationship between the public IP addresses and the private IP addresses or configure a mapping relationship between the public IP addresses as well as their ports and the private IP addresses as well as their ports.

Preferably, the apparatus for accessing a demilitarized zone host in the LAN further comprises:

a sending module, configured to: when dialing through the WAN side, send an extension tag used to indicate an identity to a server at the WAN side;

a filling module, configured to: receive a plurality of IP addresses sent by the server at the WAN side through the extension tag, and fill public IP addresses therein into the corresponding slot information.

Preferably, the second modifying module comprises:

a receiving unit, configured to: receive a reply message returned by the demilitarized zone host according to the access request, wherein the reply message comprises a destination IP address and a source IP address, wherein the destination IP address is the IP address of a client at the WAN side, and the source IP address is the private IP address of the demilitarized zone host;

a modifying unit, configured to: modify the source IP address to the public IP address of a client at the WAN side according to the configured mapping relationship.

In the embodiment of the present invention, it configures a mapping relationship between public IP addresses obtained from a wide area network (WAN) side and private IP addresses of demilitarized zone hosts at a LAN side; after receiving an access request sent by a client at the WAN side, it modifies the destination IP address in the access request to the private IP address of a corresponding demilitarized zone host at the LAN side according to the configured mapping relationship, and sends the modified access request to the demilitarized zone host; after receiving a reply message returned by the demilitarized zone host, it modifies the source IP address contained in the reply message to the public IP address of the client at the WAN side, and sends the modified reply message to the WAN side for its client to access. Because the DMZ host is located behind a NAT firewall of the CPE, there is no need to configure a public address but to configure a private address, thereby improving the utilization efficiency of IP addresses at the WAN side and enhancing the security of DMZ hosts, and providing relatively great convenience for the access of the WAN side.

The objective accomplishments, features and advantages of the present document will be further described in conjunction with embodiments and with reference to the accompanying drawings.

PREFERRED EMBODIMENTS OF THE INVENTION

It should be understood that the specific embodiments described herein are only used to explain the present document and are not intended to limit the present document.

The embodiment of the present invention provides a method for accessing a demilitarized zone host in the LAN to obtain a plurality of public IP addresses from the WAN side through a customer premise equipment (CPE), and configure a mapping relationship between the public IP addresses and the private IP addresses of DMZ hosts at the LAN side, and when a client at the WAN side accesses a DMZ host at the LAN side via the CPE, the public IP addresses are mapped to the corresponding DMZ hosts to facilitate the access of a client at the WAN side.

Figure 1:
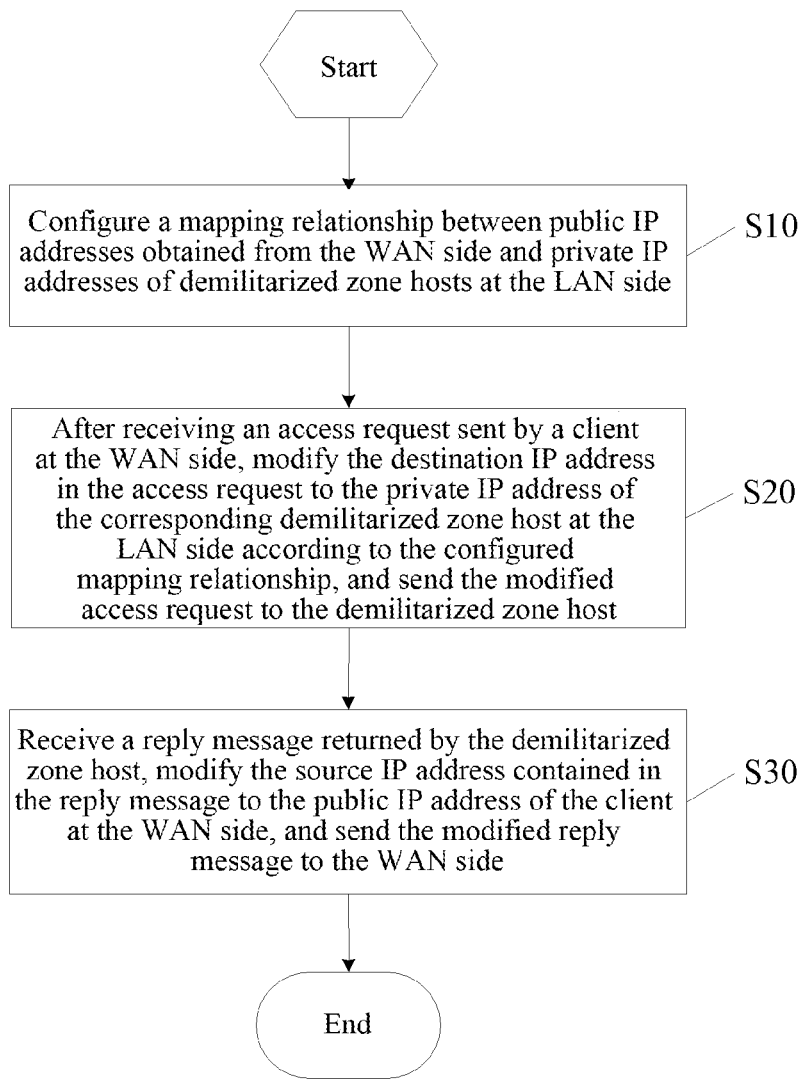
FIG. 1 is a flow diagram of an embodiment of a method for accessing a demilitarized zone host in the LAN in accordance with present document.

Referring to FIG. 1, and FIG. 1 is a flow diagram of the process of an embodiment of the method for accessing a demilitarized zone host in the LAN in accordance with the present document.

The method for accessing a demilitarized zone host in the LAN provided in the present embodiment comprises:

in step S10, it is to configure a mapping relationship between public IP addresses obtained from the WAN side and private IP addresses of demilitarized zone hosts at the LAN side;

in the SOHO office area, when a client at the WAN side accesses a DMZ host at the LAN side via a CPE, the CPE first dials through the WAN, that is, obtains an IP address from the WAN side, wherein the IP address comprises a basic IP address and a public IP address. After obtaining the public IP address, the mapping relationship between the public IP address and the private IP address of the DMZ host at the LAN side is configured, and when a client at the WAN side accesses one DMZ host, the mapping relationship can be used to map the public IP address obtained from the WAN to the DMZ host, and after the mapping is completed, the DMZ host can start to work.

In the present embodiment, said configuring a mapping relationship between the public IP addresses and the private IP addresses can be configuring a one-to-one mapping relationship between the public IP addresses and the private IP addresses, or configuring a mapping relationship between the public IP addresses as well as their ports and the private IP addresses as well as their ports.

in step 20, after receiving an access request sent by a client at the WAN side, it is to modify the destination IP address in the access request to the private IP address of the corresponding demilitarized zone host at the LAN side according to the configured mapping relationship, and send the modified access request to the demilitarized zone host;

when the client at the WAN side accesses a certain DMZ host, it sends an access request to the public IP address of the CPE at the WAN side, and after receiving the access request, the CPE modifies the destination IP address in the access request to the private IP address of the corresponding DMZ host according to the configured mapping relationship between the public IP address of the CPE at the WAN side and the public IP address of the DMZ host, and then sends the access request with the modified destination IP address to the DMZ host.

In step S30, it is to receive a reply message returned by the demilitarized zone host, modify the source IP address contained in the reply message to the public IP address of the client at the WAN side, and send the modified reply message to the WAN side.

When receiving an access request carrying the destination IP address, the DMZ host returns a reply message to the CPE, and at this time, it modifies the source IP address contained in the reply message to the public IP address of the client at the WAN side, then, sends the reply message with the modified source IP address to the WAN side for the client to access the DMZ host.

In the embodiment of the present invention, it configures a mapping relationship between public IP addresses obtained from a wide area network (WAN) side and private IP addresses of demilitarized zone hosts at a LAN side; after receiving an access request sent by a client at the WAN side, it modifies the destination IP address in the access request to the private IP address of a corresponding demilitarized zone host at the LAN side according to the configured mapping relationship, and sends the modified access request to the demilitarized zone host; after receiving a reply message returned by the demilitarized zone host, it modifies the source IP address contained in the reply message to the public IP address of the client at the WAN side, and sends the modified reply message to the WAN side for its client to access. Because the DMZ host is located behind a NAT firewall of the CPE, there is no need to configure a public address but to configure a private address, thereby improving the utilization efficiency of IP addresses at the WAN side and enhancing the security of DMZ hosts, and providing relatively great convenience for the access of the WAN side.

Figure 2:
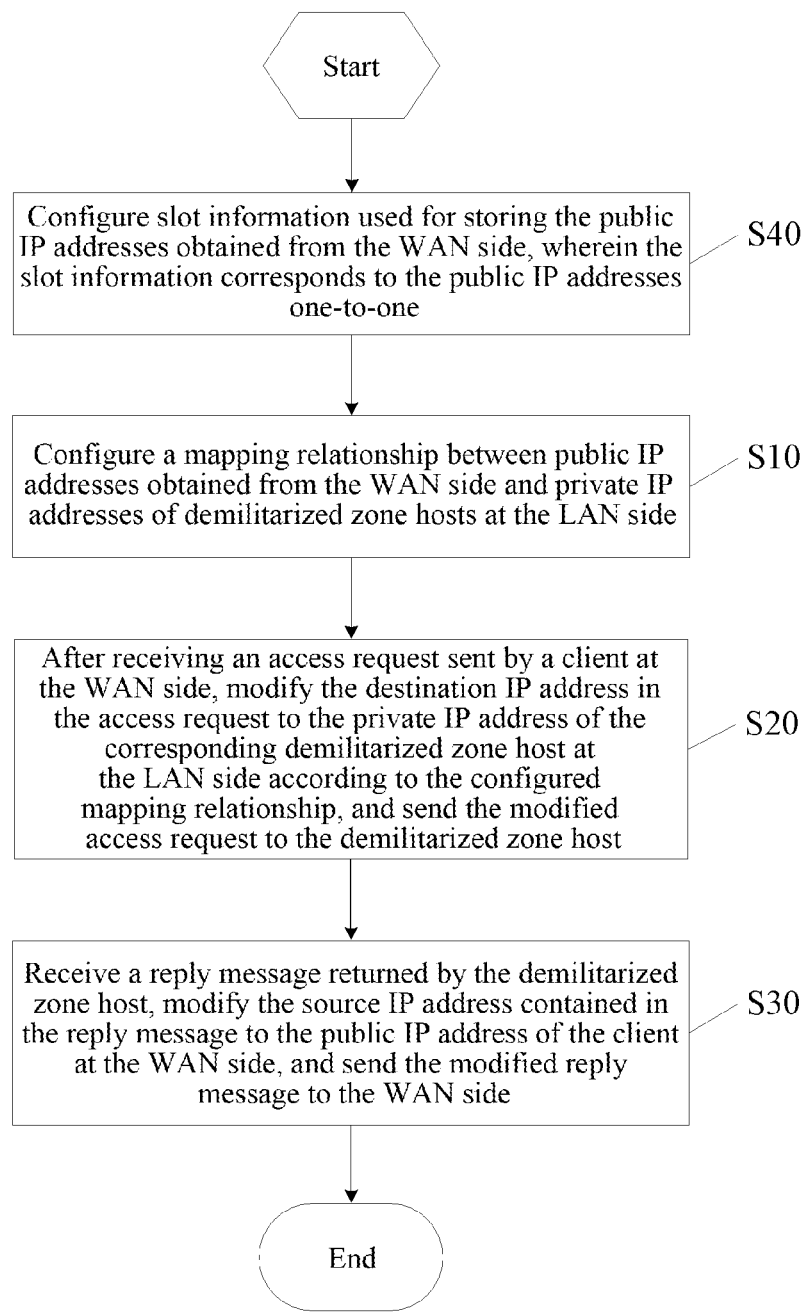
FIG. 2 is a flow diagram of another embodiment of the method for accessing a demilitarized zone host in the LAN in accordance with the present document.

Referring to FIG. 2, FIG. 2 is a flow diagram of another embodiment of the method for accessing a demilitarized zone host in the LAN in accordance with the present document.

Based on the abovementioned embodiment, before executing the step S10, the method for accessing a demilitarized zone host in the LAN in accordance with the present document further comprises:

in step S40, it is to configure slot information used for storing the public IP addresses obtained from the WAN side, wherein the slot information corresponds to the public IP addresses one-to-one.

Before configuring the mapping relationship between the public IP addresses and the private IP addresses of demilitarized zone hosts at the LAN side, first a plurality of slot information are configured, and the number of configured slot information is the same as that of the public IP addresses dynamically obtained from the WAN side, and they correspond to each other one-by-one, and the slot information are used to store the public IP addresses; in the present embodiment, the slot information can be directly filled with the public IP addresses.

Before configuring the mapping relationship between the public IP addresses and the private IP addresses of the demilitarized zone hosts at the LAN side, slot information which are used to store public IP addresses obtained from the WAN side and correspond to the public IP addresses one-to-one are configured, which provides the basis for improving the utilization efficiency of IP addresses at the WAN side.

Figure 3:
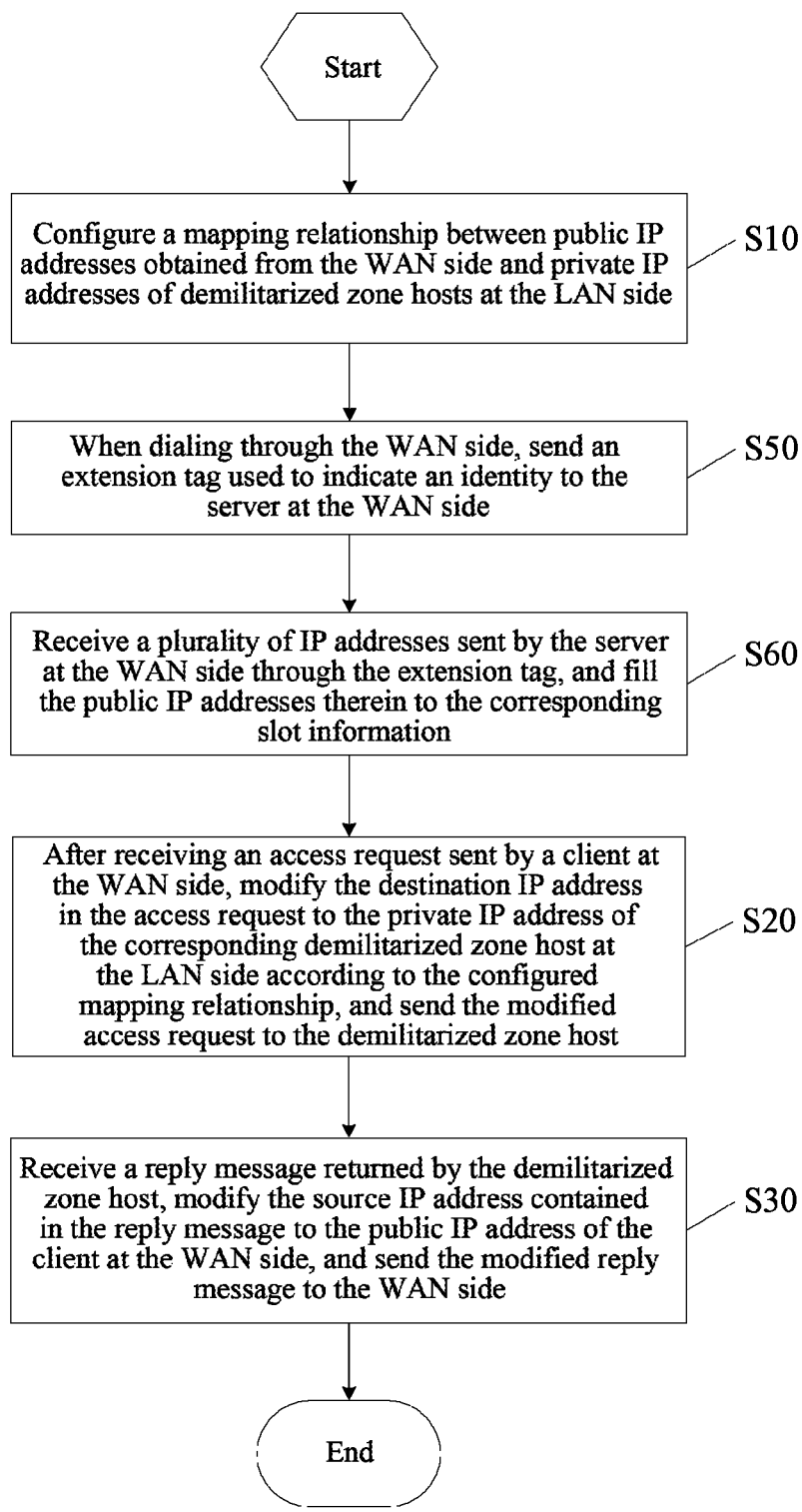
FIG. 3 is a flow diagram of still another embodiment of the method for accessing a demilitarized zone host in the LAN in accordance with the present document.

Refer to FIG. 3, and FIG. 3 is a flow diagram of still another embodiment of the method for accessing a demilitarized zone host in the LAN in accordance with the present document.

Based on the embodiment of the method for accessing a demilitarized zone host in the LAN in accordance with the present document, after executing step S10, the method further comprises:

in step S50, when dialing through the WAN side, it is to send an extension tag used to indicate an identity to the server at the WAN side;

in step S60, it is to receive a plurality of IP addresses sent by the server at the WAN side through the extension tag, and fill the public IP addresses therein to the corresponding slot information.

After configuring the mapping relationship between the public IP addresses and the private IP addresses of the DMZ hosts at the LAN side, when a client at the WAN side needs to access a DMZ host at the LAN side, the CPE first establishes a connection to the server at the WAN side through the access protocol, i.e., dials through the WAN side, and in the present embodiment, the DHCP or PPP protocol can be used to establish a connection to the server at the WAN side.

When establishing a connection via the DHCP protocol, the DHCP protocol client of the CPE sends an extension tag used to indicate the identity to the server at the WAN side, and after analyzing the extension tag, the broadband access server performs authentication in a remote user dialing authentication system, then the DHCP server decides whether it needs to send a plurality of IP addresses to the CPE or not by judging whether the DHCP protocol client has applied for the SOHO service or not, and if yes, it sends a plurality of IP addresses to the CPE through the extension tag, and if no, it only sends one IP address to the CPE.

When establishing a connection through the PPP, it has the authentication function by itself and can directly performs authentication in the remote user dialing authentication system based on the user name, and decides whether it needs to send a plurality of IP addresses to the CPE or not by judging whether the DHCP protocol client has applied for the SOHO service or not, and if yes, it sends a plurality of IP addresses to the CPE through the extension tag, and if no, it only sends one IP address to the CPE.

After receiving the plurality of IP addresses sent by the server at the WAN side through the extension tag, the CPE fills the public IP addresses therein into the corresponding slot information. Thereafter, the CPE enables the configured mapping relationship between the public IP addresses and the private IP addresses of the DMZ hosts at the LAN side, for the client at the WAN side to access the DMZ host at the LAN side.

When dialing through the WAN side, the extension tag used to indicate the identity is sent to the server at the WAN side; and after receiving a plurality of IP addresses sent by the server at the WAN side through the extension tag, the public IP addresses therein are filled into the corresponding slot information, thus ensuring the mapping relationship between the public IP addresses and the private IP addresses, and further providing convenience for the access of the wide area network side.

Figure 4:
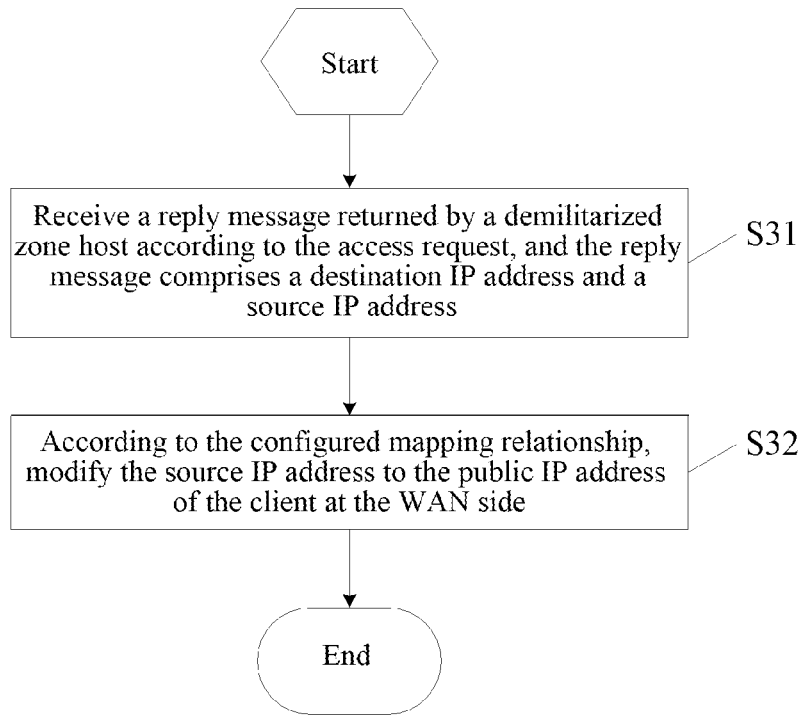
FIG. 4 is a schematic diagram of a process of modifying a source IP address contained in a reply message to a public IP address in the method for accessing a demilitarized zone host in the LAN in accordance with the present document.

Refer to FIG. 4, and FIG. 4 is a schematic diagram of the process of modifying the source IP address contained in the reply message to the public IP address in the method for accessing a demilitarized zone host in the LAN in accordance with the present document.

In one embodiment of the method for accessing a demilitarized zone host in the LAN in accordance with the present document, the step S30 comprises:

in step S31, it is to receive a reply message returned by a demilitarized zone host according to the access request, and the reply message comprises a destination IP address and a source IP address, wherein the destination IP address is the IP address of a client at the WAN side, and the source IP address is the private IP address of a demilitarized zone host;

in step S32, according to the configured mapping relationship, it is to modify the source IP address to the public IP address of the client at the WAN side.

After the CPE sends the access request with the modified destination IP address to the DMZ host, the DMZ host returns a reply message to the CPE, at this time, the reply message received by the CPE comprises the destination IP address and the source IP address, wherein the destination IP address is the IP address of the client at the WAN side and the source IP address is the private IP address of the demilitarized zone host. Then, the CPE modifies the source IP address therein to the public IP address of the client at the WAN side according to the configured mapping relationship. After modifying the source IP address, the CPE sends the modified reply message to the WAN side for its client to access.

After sending the access request with the modified destination IP address to the DMZ host and receiving the reply message returned by the DMZ host, according to the configured mapping relationship, the CPE modifies the source IP address therein to the public IP address of the client at the WAN side, thus further ensuring that the utilization efficiency of IP addresses at the wide area network side can be improved, and further providing relatively great convenience for the access of the WAN side.

The present document further provides an apparatus for accessing a demilitarized zone host in the LAN.

Figure 5:
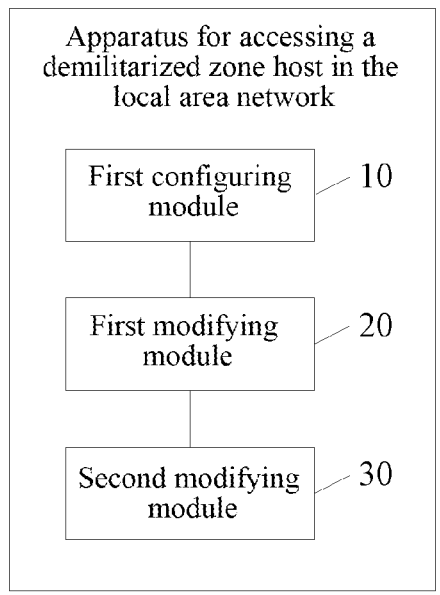
FIG. 5 is a structural diagram of an embodiment of an apparatus for accessing a demilitarized zone host in the LAN in accordance with present document.

Refer to FIG. 5, and FIG. 5 is a structural diagram of an embodiment of the apparatus for accessing a demilitarized zone host in the LAN in accordance with the present document.

The apparatus for accessing a demilitarized zone host in the LAN provided in the present embodiment comprises:

a first configuring module 10, used to configure a mapping relationship between public IP addresses obtained from the WAN side and private IP addresses of demilitarized zone hosts at the LAN side;

a first modifying module 20, used to: after receiving an access request sent by a client at the WAN side, modify a destination IP address in the access request to the private IP address of the corresponding demilitarized zone host at the LAN side according to the configured mapping relationship, and send the modified access request to the demilitarized zone host;

a second modifying module 30, used to receive a reply message returned by the demilitarized zone host, modify the source IP address contained in the reply message to the public IP address of the client at the WAN side, and send the modified reply message to the WAN side.

In the SOHO office area, when a client at the WAN side accesses a DMZ host on the LAN side via a CPE, the CPE first dials through the WAN, that is, it obtains an IP address from the WAN side, wherein the IP address comprises a basic IP address and a public IP address. After obtaining the public IP address, the first configuring module 10 configures the mapping relationship between the public IP addresses and the private IP addresses of the DMZ hosts at the LAN side, and when the client at the WAN side accesses a certain DMZ host, it can map the public IP address obtained from the WAN side to the DMZ host through the mapping relationship, and after the mapping is completed, the DMZ host can start to work.

In the present embodiment, said configuring a mapping relationship between the public IP addresses and the private IP addresses can be configuring a one-to-one mapping relationship between the public IP addresses and the private IP addresses, or configuring a mapping relationship between the public IP addresses as well as their ports and the private IP addresses as well as their ports.

When the client at the WAN side accesses a certain DMZ host, it sends an access request to the public IP address of the CPE at the WAN side, and after the CPE receives the access request, the first modifying module 20 modifies the destination IP address in the access request to the private IP address of the corresponding DMZ host according to the configured mapping relationship between the public IP addresses of the CPE at the WAN side and the public IP addresses of the DMZ hosts, and then sends the access request with the modified destination IP address to the DMZ host.

After receiving an access request carrying the destination IP address, the DMZ host returns a reply message to the CPE, at this time, the second modifying module 30 modifies the source IP address contained in the reply message to the public IP address of the client at the WAN side, then sends the reply message with the modified source IP address to the WAN side for the client to access the DMZ host.

In the embodiment of the present invention, it configures a mapping relationship between public IP addresses obtained from a wide area network (WAN) side and private IP addresses of demilitarized zone hosts at a LAN side; after receiving an access request sent by a client at the WAN side, it modifies the destination IP address in the access request to the private IP address of a corresponding demilitarized zone host at the LAN side according to the configured mapping relationship, and sends the modified access request to the demilitarized zone host; after receiving a reply message returned by the demilitarized zone host, it modifies the source IP address contained in the reply message to the public IP address of the client at the WAN side, and sends the modified reply message to the WAN side for its client to access. Because the DMZ host is located behind a NAT firewall of the CPE, there is no need to configure a public address but to configure a private address, thereby improving the utilization efficiency of IP addresses at the WAN side and enhancing the security of DMZ hosts, and providing relatively great convenience for the access of the WAN side.

Figure 6:
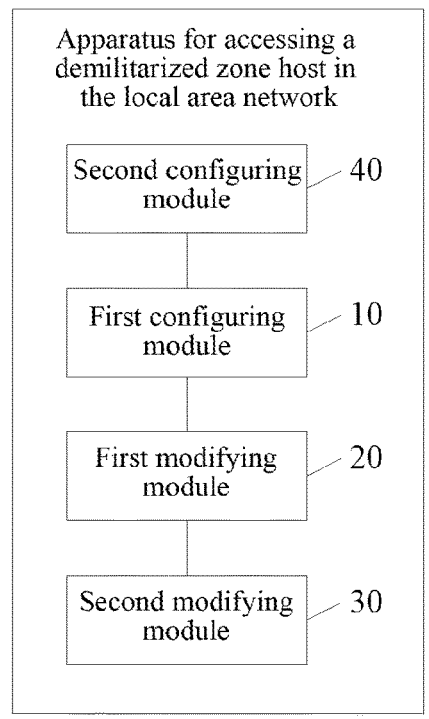
FIG. 6 is a structural diagram of another embodiment of the apparatus for accessing a demilitarized zone host in the LAN in accordance with the present document.

Refer to FIG. 6, and FIG. 6 is a structural diagram of another embodiment of the apparatus for accessing a demilitarized zone host in the LAN in accordance with the present document.

Based on the abovementioned embodiment, the apparatus for accessing a demilitarized zone host in the LAN further comprises:

a second configuring module 40, used to configure slot information used for storing the public IP addresses obtained from the WAN side, wherein the slot information correspond to the public IP addresses one-to-one.

Before configuring the mapping relationship between the public IP addresses and the private IP addresses of demilitarized zone hosts at the LAN side, the second configuring module 40 firstly configures a plurality of slot information, and the number of configured slot information is the same as that of the public IP addresses dynamically obtained from the WAN side, and they correspond to each other one-to-one, and the slot information is used to store the public IP addresses; in the present embodiment, the slot information can be directly filled with the public IP addresses.

Before configuring the mapping relationship between the public IP addresses and the private IP addresses of demilitarized zone hosts at the LAN side, slot information which is used to store public IP addresses obtained from the WAN side and correspond to the public IP addresses one-to-one is configured, which provides the basis for improving the utilization efficiency of IP addresses at the WAN side.

Figure 7:
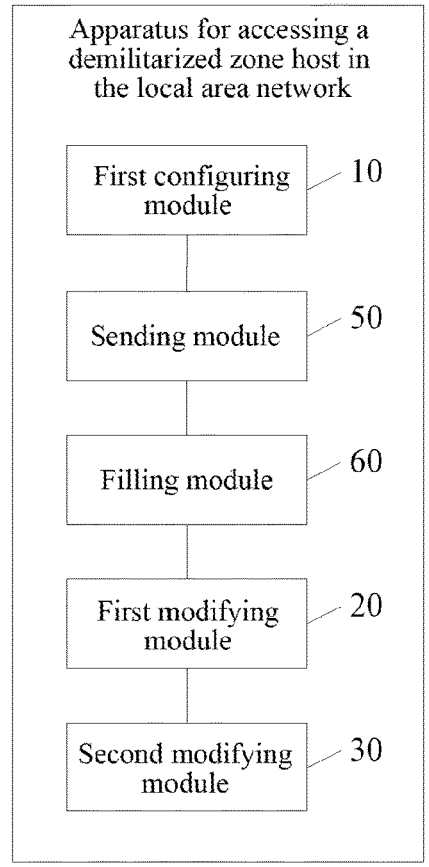
FIG. 7 is a structural diagram of still another embodiment of the apparatus for accessing a demilitarized zone host in the LAN in accordance with the present document.

Refer to FIG. 7, and FIG. 7 is a structural diagram of another embodiment of the apparatus for accessing a demilitarized zone host in the LAN in accordance with the present document.

Based on the embodiment of the apparatus for accessing a demilitarized zone host in the LAN, the apparatus for accessing a demilitarized zone host in the LAN further comprises:

a sending module 50, used to: when dialing through the WAN side, send an extension tag used to indicate the identity to the server at the WAN side;

a filling module 60, used to receive a plurality of IP addresses sent by the server at the WAN side through the extension tag, and fill the public IP addresses therein into the corresponding slot information.

After configuring the mapping relationship between the public IP addresses and the private IP addresses of the DMZ hosts at the LAN side, when a client at the WAN side needs to access a DMZ host at the LAN side, the CPE first establishes a connection to the server at the WAN side through the Access Protocol, i.e., dialing through the WAN side, in the present embodiment, the DHCP or PPP protocol can be used to establish a connection to the server at the WAN side.

When establishing a connection through the DHCP protocol, the DHCP protocol client of the CPE sends an extension tag used to indicate the identity to the server at the WAN side via the sending module 50, and after the broadband access server analyzes the extension tag, it performs authentication in a remote user dialing authentication system, thereafter the DHCP server decides if it needs to send a plurality of IP addresses to the CPE or not by judging whether the DHCP protocol client has applied for the SOHO service or not, and if yes, it sends a plurality of IP addresses to the CPE through the extension tag, and if no, it only sends one IP address to the CPE.

When establishing a connection through the PPP protocol, the CPE sends an extension tag used to indicate the identity to the server at the WAN side through the sending module 50, and it has the authentication function by itself and can directly perform authentication in the remote user dialing authentication system based on the user name, and it decides whether it needs to send a plurality of IP addresses to the CPE or not by judging whether the DHCP protocol client has applied for the SOHO service or not, if yes, it sends a plurality of IP addresses to the CPE through the extension tag, and if no, it only sends one IP address to the CPE.

When the CPE receives a plurality of IP addresses sent by the server at the WAN side through the extension tag, the filling module 60 fills the public IP addresses therein into the corresponding slot information. Thereafter, the CPE enables the configured mapping relationship between the public IP addresses and the private IP addresses of the DMZ hosts at the LAN side, for the client at the WAN side to access the DMZ host at the LAN side.

When dialing through the WAN side, the extension tag used to indicate the identity is sent to the server at the WAN side; and after receiving a plurality of IP addresses sent by the server at the WAN side through the extension tag, the public IP addresses therein are filled into the corresponding slot information, thus ensuring the mapping relationship between the public IP addresses and the private IP addresses, and further providing convenience for the access of the wide area network side.

Figure 8:
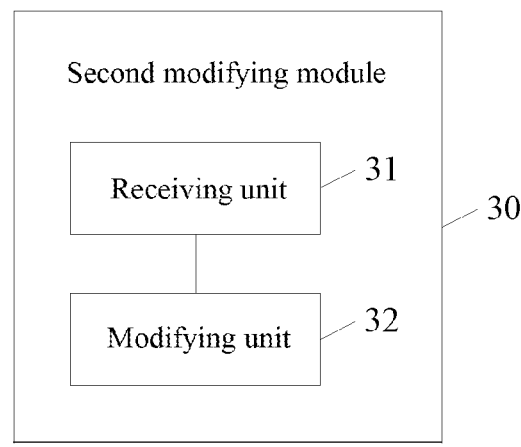
FIG. 8 is a structural diagram of a second modifying module in the apparatus for accessing a demilitarized zone host in the LAN in accordance with an embodiment of the present invention.

Refer to FIG. 8, and FIG. 8 is a structural diagram of the second modifying module in the apparatus for accessing a demilitarized zone host in the LAN in accordance with the present document.

In an embodiment of the apparatus for accessing the demilitarized zone host in the LAN in accordance with the present document, the second modifying module 30 comprises:

a receiving unit 31, used to receive a reply message returned by the demilitarized zone host according to the access request, wherein the reply message comprises a destination IP address and a source IP address, wherein the destination IP address is the IP address of a client at the WAN side, and the source IP address is the private IP address of the demilitarized zone host;

a modifying unit 32, used to modify the source IP address to the public IP address of the client at the WAN side according to the configured mapping relationship.

After the CPE sends the access request with the modified destination IP address to the DMZ host, the DMZ host returns a reply message to the CPE, at this time, the reply message received by the CPE through its receiving unit 31 comprises the destination IP address and the source IP address, wherein the destination IP address is the IP address of the client at the WAN side, and the source IP address is the private IP address of the demilitarized zone host. Then, the modifying unit 32 modifies the source IP address therein to the public IP address of the client at the WAN side according to the configured mapping relationship. After modifying the source IP address, the modified reply message is sent to the WAN side for its client to access.

After the CPE sends the access request with the modified destination IP address to the DMZ host and receives a reply message returned by the DMZ host, according to the configured mapping relationship, the CPE modifies the source IP address therein to the public IP address of the client at the WAN side, thus further ensuring that the utilization efficiency of IP addresses at the wide area network side can be improved, and further providing relatively great convenience for the access of the WAN side.

The above description is only preferred embodiments of the present invention, and is not intended to limit the patent scope of the present document, therefore, any equivalent structures or equivalent process transformations made with the use of the contents of the specification and the accompanying drawings of the present document, directly or indirectly used in other related technical fields, should be similarly included in the patent protection scope of the present document.

INDUSTRIAL APPLICABILITY

In the embodiment of the present invention, there is no need to configure a public IP address but to configure a private IP address can be configured since the DMZ hosts are located behind the NAT firewall of the CPE, so as to improve the utilization efficiency of IP addresses at the WAN side and to improve the security of the DMZ hosts, and also provide relatively great convenience for the access of the WAN side.

What is claimed is:

1. A method for accessing a demilitarized zone host in a local area network (LAN), comprising:
configuring a mapping relationship between public internet protocol (IP) addresses obtained from a wide area network (WAN) side and private IP addresses of demilitarized zone hosts at a LAN side;
after receiving an access request sent by a client at the WAN side, modifying a destination IP address in the access request to a private IP address of a corresponding demilitarized zone host at the LAN side according to the configured mapping relationship, and sending the modified access request to the demilitarized zone host;
receiving a reply message returned by the demilitarized zone host, modifying a source IP address contained in the reply message to a public IP address of the client at the WAN side, and sending the modified reply message to the WAN side,
wherein before performing said configuring a mapping relationship between public IP addresses obtained from the WAN side and private IP addresses of demilitarized zone hosts at the LAN side, the method further comprises:
configuring slot information used for storing the public IP addresses obtained from the WAN side, wherein the slot information corresponds to the public IP addresses one-to-one,
wherein after performing said configuring the mapping relationship between the public IP addresses obtained from the WAN side and the private IP addresses of the demilitarized zone hosts at the LAN side, the method further comprises:
when dialing through the WAN side, sending an extension tag used to indicate an identity of the client at the WAN side to a server at the WAN side; and
receiving a plurality of IP addresses sent by the server at the WAN side through the extension tag, and filling public IP addresses therein into corresponding slot information.

2. The method of claim 1, wherein said configuring a mapping relationship between public IP addresses obtained from the WAN side and private IP addresses of demilitarized zone hosts at the LAN side comprises:
configuring a one-to-one mapping relationship between the public IP addresses and the private IP addresses, or configuring a mapping relationship between the public IP addresses as well as ports thereof and the private IP addresses as well as ports thereof.

3. The method of claim 2, wherein said receiving a reply message returned by the demilitarized zone host and modifying a source IP address contained therein to the public IP address comprises:
receiving a reply message returned by the demilitarized zone host according to the access request, wherein the reply message comprises a destination IP address and a source IP address, wherein the destination IP address is an IP address of the client at the WAN side, and the source IP address is a private IP address of the demilitarized zone host;
modifying the source IP address to the public IP address of the client at the WAN side according to the configured mapping relationship.

4. The method of claim 1, wherein said receiving a reply message returned by the demilitarized zone host and modifying a source IP address contained therein to the public IP address comprises:
receiving a reply message returned by the demilitarized zone host according to the access request, wherein the reply message comprises a destination IP address and a source IP address, wherein the destination IP address is an IP address of the client at the WAN side, and the source IP address is a private IP address of the demilitarized zone host;
modifying the source IP address to the public IP address of the client at the WAN side according to the configured mapping relationship.

5. An apparatus for accessing a demilitarized zone host in a LAN, comprising hardware performing instructions stored in a non-transitory computer readable medium which executes steps in the following modules:
a first configuring module, configured to: configure a mapping relationship between public IP addresses obtained from a WAN side and private IP addresses of demilitarized zone hosts at a LAN side;
a first modifying module, configured to: after receiving an access request sent by a client at the WAN side, modify a destination IP address in the access request to a private IP address of a corresponding demilitarized zone host at the LAN side according to the configured mapping relationship, and send the modified access request to the demilitarized zone host;
a second modifying module configured to: receive a reply message returned by the demilitarized zone host, modify a source IP address contained in the reply message to a public IP address of the client at the WAN side, and send the modified reply message to the WAN side;
a second configuring module, configured to: configure slot information used for storing public IP addresses obtained from the WAN side, wherein the slot information corresponds to the public IP addresses one-to-one;
a sending module, configured to: when dialing through the WAN side, send an extension tag used to indicate an identity of the client at the WAN side to a server at the WAN side; and
a filling module, configured to: receive a plurality of IP addresses sent by the server at the WAN side through the extension tag, and fill public IP addresses therein into corresponding slot information.

6. The apparatus of claim 5, wherein the first configuring module is configured to:
configure a one-to-one mapping relationship between the public IP addresses and the private IP addresses or configure a mapping relationship between the public IP addresses as well as ports thereof and the private IP addresses as well as ports thereof.

7. The apparatus of claim 6, wherein the second modifying module comprises:
a receiving unit, configured to: receive a reply message returned by the demilitarized zone host according to the access request, wherein the reply message comprises a destination IP address and a source IP address, wherein the destination IP address is an IP address of the client at the WAN side, and the source IP address is a private IP address of the demilitarized zone host;

a modifying unit, configured to: modify the source IP address to the public IP address of the client at the WAN side according to the configured mapping relationship.

8. The apparatus of claim 5, wherein the second modifying module comprises:
a receiving unit, configured to: receive a reply message returned by the demilitarized zone host according to the access request, wherein the reply message comprises a destination IP address and a source IP address, wherein the destination IP address is an IP address of the client at the WAN side, and the source IP address is a private IP address of the demilitarized zone host;
a modifying unit, configured to: modify the source IP address to the public IP address of the client at the WAN side according to the configured mapping relationship.

* * * * *